United States Patent
Nefcy et al.

(10) Patent No.: US 10,336,334 B2
(45) Date of Patent: Jul. 2, 2019

(54) REGENERATIVE BRAKING DOWNSHIFT CONTROL USING PREDICTIVE INFORMATION

(71) Applicant: Ford Global Technologies, LLC, Dearborn, MI (US)

(72) Inventors: Bernard D. Nefcy, Novi, MI (US); Yanan Zhao, Ann Arbor, MI (US); Ming Lang Kuang, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 269 days.

(21) Appl. No.: 15/360,262

(22) Filed: Nov. 23, 2016

(65) Prior Publication Data
US 2018/0141557 A1    May 24, 2018

(51) Int. Cl.
| | |
|---|---|
| B60W 30/18 | (2012.01) |
| B60W 10/08 | (2006.01) |
| B60W 10/11 | (2012.01) |
| B60W 20/00 | (2016.01) |
| B60W 50/00 | (2006.01) |

(Continued)

(52) U.S. Cl.
CPC ......... *B60W 30/18127* (2013.01); *B60K 6/48* (2013.01); *B60W 10/08* (2013.01); *B60W 10/11* (2013.01); *B60W 20/00* (2013.01); *B60W 20/30* (2013.01); *B60W 50/0097* (2013.01); *B60K 2006/4825* (2013.01); *B60W 2420/50* (2013.01); *B60W 2540/12* (2013.01); *B60W 2540/30* (2013.01); *B60W 2550/142* (2013.01); *B60W 2550/30* (2013.01); *B60W 2550/308* (2013.01); *B60W 2550/402* (2013.01); *B60W 2710/083* (2013.01); *B60W 2710/1005* (2013.01); *B60Y 2300/18125* (2013.01);

(Continued)

(58) Field of Classification Search
CPC ........... B60W 30/18127; B60W 10/08; B60W 20/00; B60W 50/0097; B60W 2540/30; B60W 2550/308; B60W 2540/12; B60W 40/09; B60Y 2300/18125
See application file for complete search history.

(56) References Cited

U.S. PATENT DOCUMENTS 5,984,034 A * 11/1999 Morisawa ................ B60K 6/48
                                                  180/65.28
2012/0101697 A1    4/2012 Hawkins et al.

(Continued)

*Primary Examiner* — Stacey A Fluhart
(74) *Attorney, Agent, or Firm* — David Kelley; Brooks Kushman P.C.

(57) ABSTRACT

A vehicle may include an engine selectively coupled to a motor and a transmission. The vehicle may include a controller configured to, in response to actuation of a brake pedal, command the transmission to downshift during a regenerative braking event based on a regenerative braking downshift torque. The regenerative braking downshift torque may be determined from a predicted brake pedal input rate. The predicted brake pedal input rate may be based on road grade, vehicle headway range and a driver history. The predicted brake pedal input rate may be classified as Low, Medium, or High. The regenerative braking downshift torque may also be determined from a predicted brake torque rate that is based on a predicted deceleration rate of the vehicle, a vehicle speed prediction and a road grade prediction within a future time interval that begins upon actuation of the brake pedal.

13 Claims, 6 Drawing Sheets

(51) Int. Cl.
  *B60K 6/48* (2007.10)
  *B60W 20/30* (2016.01)
(52) U.S. Cl.
  CPC ........ *Y02T 10/6221* (2013.01); *Y02T 10/6252* (2013.01); *Y10S 903/93* (2013.01); *Y10S 903/945* (2013.01)

(56) References Cited

U.S. PATENT DOCUMENTS

| | | |
|---|---|---|
| 2013/0296100 A1 | 11/2013 | Nefcy et al. |
| 2015/0298684 A1* | 10/2015 | Schwartz .............. B60W 10/10 701/22 |
| 2015/0360691 A1* | 12/2015 | Nefcy ............. B60W 30/18127 701/22 |
| 2016/0009271 A1* | 1/2016 | Choi .................... B60W 40/09 701/22 |
| 2016/0121727 A1* | 5/2016 | Kim ......................... B60L 7/26 701/70 |
| 2018/0100579 A1* | 4/2018 | Noguchi ............. F16H 61/0213 |

* cited by examiner

REGENERATIVE BRAKING DOWNSHIFT CONTROL USING PREDICTIVE INFORMATION

TECHNICAL FIELD

The present disclosure relates to an automatic transmission downshifting strategy to increase regenerative braking efficiency.

BACKGROUND

Regenerative braking is used on many hybrid and electric vehicles to generate electricity during braking events to increase fuel economy. During these events, kinetic energy of the vehicle is converted to electricity for charging a high voltage battery using an electric machine as a brake and a generator. Since regenerative braking efficiency decreases at lower speeds, an automatic transmission of the vehicle may be downshifted to increase the electric machine speed and increase the available torque and efficiency. It is desirable to provide systems and methods for scheduling the first downshift of the automatic transmission at a proper time during the brake application such that the electric machine can deliver its maximum power to increase regenerative braking efficiency and fuel economy.

SUMMARY

According to embodiments of the present disclosure, systems and methods for controlling a transmission downshift during a regenerative braking event to increase regenerative braking efficiency and fuel economy are disclosed. In particular, the timing of the first regenerative braking downshift is adjusted based on the upcoming or predicted brake torque rate and/or brake pedal input rate.

In one embodiment, a vehicle is disclosed having an engine selectively coupled to a motor and a transmission. The vehicle includes a controller configured to, in response to actuation of a brake pedal, command the transmission to downshift during a regenerative braking event based on a regenerative braking downshift torque. The regenerative braking downshift torque is determined from a predicted brake pedal input rate. The predicted brake pedal input rate may be based on an instantaneous road grade calculated upon actuation of the brake pedal and an average road grade estimated over a future time interval that begins with actuation of the brake pedal. The predicted brake pedal input rate may also be based on a driver history. The predicted brake pedal input rate may further be based on a headway range and a rate of change thereof. The predicted brake pedal input rate may be classified as one of Low, Medium, and High. The regenerative braking downshift torque may also be determined from a minimum regenerative torque that is based on a minimum motor torque and a threshold value associated with a specified margin of operation of the motor.

In another embodiment, a vehicle is disclosed having an engine selectively coupled to a motor and a transmission. The vehicle includes a controller configured to, in response to actuation of a brake pedal, command the transmission to downshift during a regenerative braking event based on a regenerative braking downshift torque determined from a predicted brake torque rate. The predicted brake torque rate may be based on a predicted deceleration rate of the vehicle over a future time interval that begins upon actuation of the brake pedal. The predicted brake torque rate may also be based on a vehicle speed prediction and a road grade prediction within a future time interval that begins upon actuation of the brake pedal. The regenerative braking downshift torque may further be determined from a transmission shift time that is based on an amount of time between execution of a transmission downshift and a change in a torque ratio resulting from downshifting the transmission during the regenerative braking event.

In yet another embodiment, a method is disclosed that includes, in response to a brake pedal actuation, commanding a transmission of a vehicle to downshift during a regenerative braking event based on a regenerative braking downshift torque determined from one of a predicted brake pedal rate and a predicted brake torque rate. The predicted brake pedal rate may be based on a difference between an instantaneous road grade and an average road grade.

Various embodiments may provide one or more advantages. For example, regenerative braking downshift control according to various embodiments adjusts the first regenerative braking downshift timing based on the upcoming or predicted brake rate. Thus, the faster the brake is applied, the earlier the first regenerative braking downshift will occur. This helps to increase regenerative braking efficiency and fuel economy. The above advantages and other advantages and features of various embodiments of the claimed subject matter may be recognized by those of ordinary skill in the art based on the representative embodiments described and illustrated.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
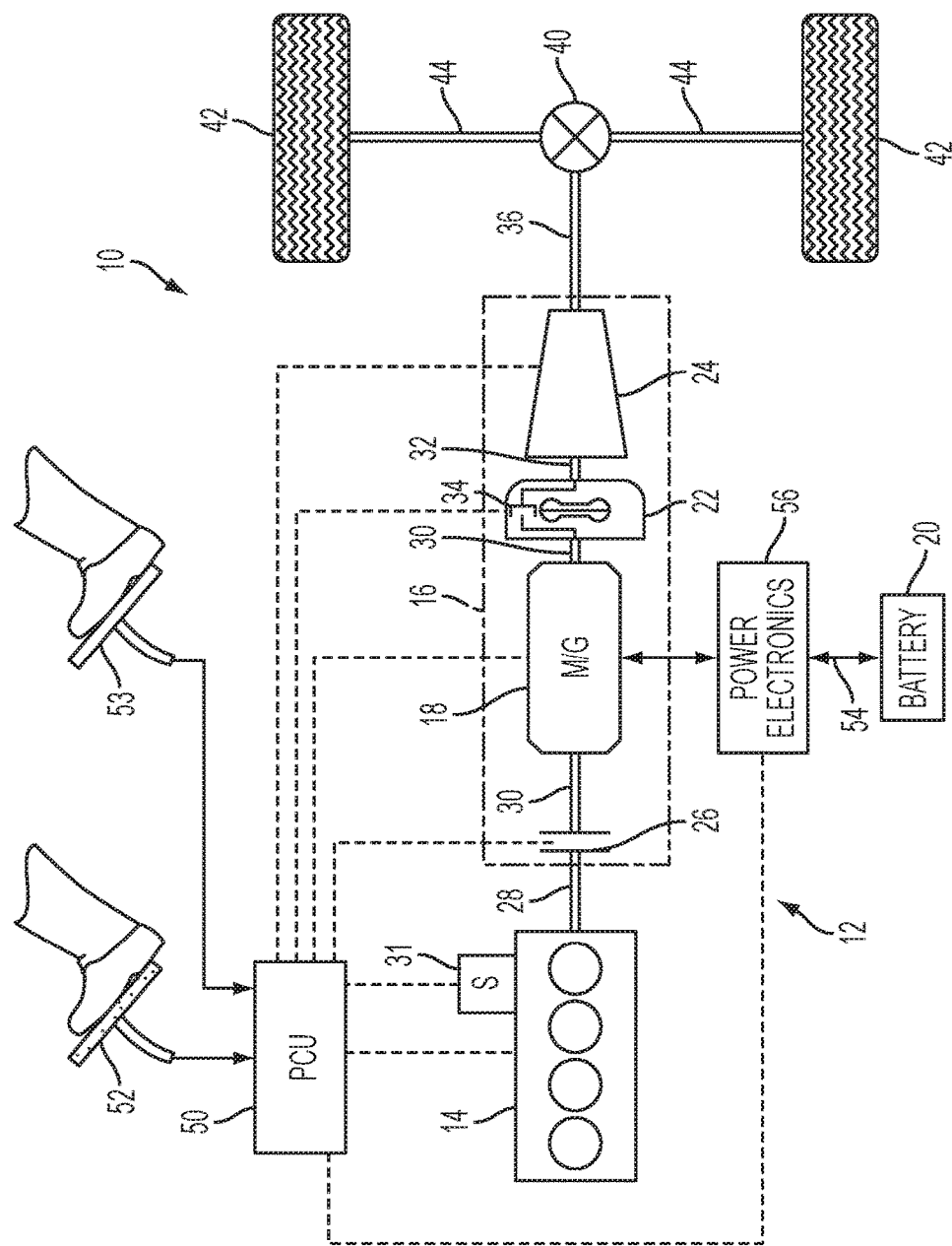
FIG. 1 is a schematic illustration of a hybrid vehicle according to one or more embodiments of the present disclosure.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The engine 14, M/G 18, torque converter 22, and the automatic transmission 16 are connected sequentially in series, as illustrated in FIG. 1.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as regenerative braking and downshifting, starting/stopping, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (APPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

A brake pedal 53 is used by the driver of the vehicle 10 to create a vehicle braking demand. Depressing brake pedal 53 generates a braking input signal that is interpreted by controller 50 as a command to decelerate the vehicle. To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode." The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. During a regenerative-braking event, the transmission 24 may be downshifted as the higher speed of transmission 24 allows for greater regenerative braking power at higher efficiencies.

The electric motor (M/G) 18 usually operates at a constant torque region when the motor speed is below a base speed, and operates at a constant power region when the motor speed is above the base speed. At this constant torque region, the electric motor 18 cannot deliver its maximum power. As a result, the braking power recuperated may be limited by power of the electric motor 18 during a braking event. To maximize regenerative braking efficiency, it is often desirable to raise the motor speed to have it operate at the constant power region to use the full potential of the electric motor 18. At the instant when the brake pedal 53 is applied, the electric motor speed is usually below the base speed, and the brake torque increases from zero to a relatively constant level. It is therefore important to have the first downshift of the automatic transmission 24 scheduled at a proper time during the brake application such that the constant torque region can be avoided to maximize regenerative braking efficiency.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

The MHT implementation is well-suited to provide regenerative braking through the drivetrain, as discussed above. Regenerative braking is a key feature utilized to increase vehicle fuel economy. A regenerative braking event may begin with the release of the accelerator pedal and application of the brake pedal. During regenerative braking, the amount of negative torque (or regenerative braking torque) that can be applied to the motor is constrained by the minimum limit of the motor. To avoid a situation where the motor operates in the constant torque region where the motor cannot deliver its maximum power, it is important to have the first downshift of the automatic transmission scheduled at a proper time to maximize regenerative braking efficiency.

Embodiments according to the present disclosure provide systems and methods of transmission downshift control for the time period right after application of the brake pedal and prior to the first regenerative braking downshift of the transmission during a regenerative braking event. In particular, embodiments related to controlling the first regenerative braking downshift using a predicted brake pedal input rate and a predicted brake torque rate are disclosed and described herein.

Figure 2:
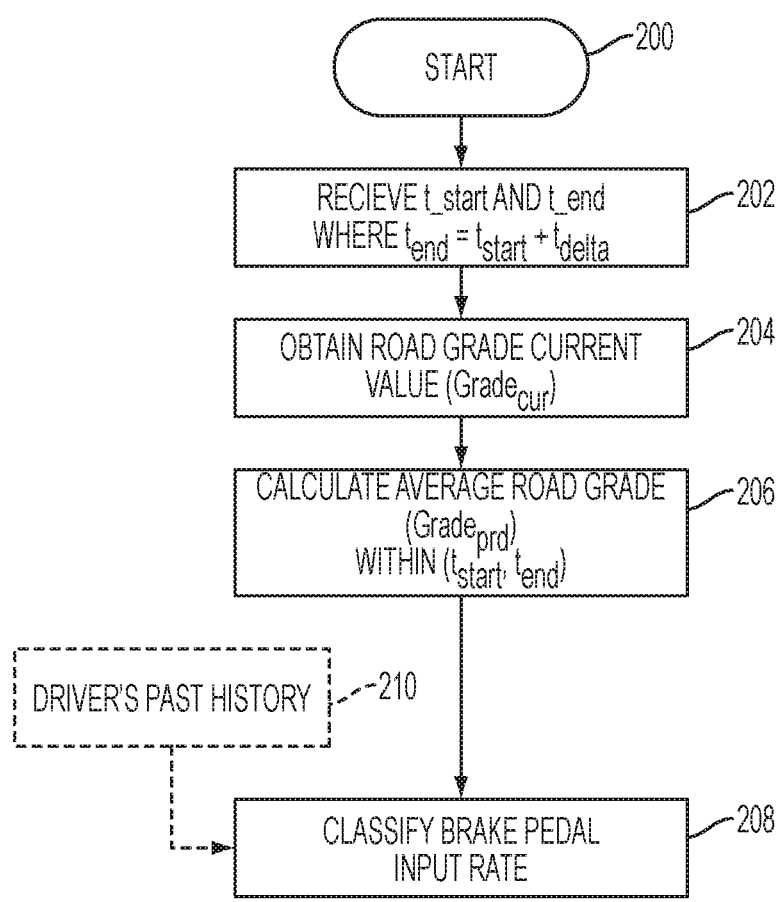
FIG. 2 is a flowchart illustrating a method for classifying a brake pedal input rate using road grade predictive information according to one or more embodiments of the present disclosure.

Now referring to FIG. 2, a flow diagram is shown having a start 200 for classifying a predicted brake pedal input rate based on road grade information. Road grade information can be obtained from geographical information systems (GIS) and global positioning systems (GPS) that can identify the location of a vehicle and the surrounding terrain. The classification of the predicted brake pedal input rate can be done with fuzzy logic rules or with lookup tables. The predicted brake pedal input rate can be classified into three levels: High, Medium, or Low, or it can be further refined into additional levels.

With continual reference to FIG. 2, the control algorithm may define a look ahead window or future time interval ($t_{start}$, $t_{end}$) over which a predicted brake pedal input rate is classified into input levels (e.g., High, Medium or Low), as shown at step 202. In particular, the controller may receive $t_{start}$ at step 202, which may be initiated by application of the brake pedal. The look ahead window or future time interval ($t_{start}$, $t_{end}$) may have a predefined length of time $t_{delta}$, resulting in $t_{end}=t_{start}+t_{delta}$. In step 204, the controller obtains the current or instantaneous road grade value ($Grade_{cur}$) and estimated road grade values within the look ahead window ($t_{start}$, $t_{end}$). In step 206, the controller may then calculate the average predicted road grade ($Grade_{prd}$) within the look ahead window ($t_{start}$, $t_{end}$). In step 208, the controller then classifies the predicted brake pedal input rate into an input level (e.g., High, Medium or Low) based on a comparison of the current road grade ($Grade_{cur}$) and the average predicted road grade ($Grade_{prd}$). Specifically, the controller may determine a difference between, or change in, the current road grade ($Grade_{cur}$) and the average predicted road grade ($Grade_{prd}$) to predict whether the brake pedal input rate will be High, Medium, Low or some other refined level.

For example, a vehicle having a high elevation and traveling on a steep decline would generally result in a higher brake pedal input rate, which may be classified as High, as compared to a vehicle having a low elevation and traveling on a gradual decline that may have a lower brake pedal input rate classified as Low.

Moreover, a controller may use a driver's past history, if available, to classify the predicted brake pedal input rate over the look ahead window or future time interval ($t_{start}$, $t_{end}$), as shown at step 210. Specifically, the controller may determine a difference between the current road grade ($Grade_{cur}$) and the average predicted road grade ($Grade_{prd}$) and then refer to a lookup table to obtain a driver's past history of brake input for that difference or change in road grade. The controller can then use this information to classify the predicted brake pedal input rate into three or more input levels, such as High, Medium or Low, for example. One of ordinary skill in the art would understand that classification of the predicted brake pedal input rate is not limited to three input levels and other classification methods could be implemented.

Figure 3:
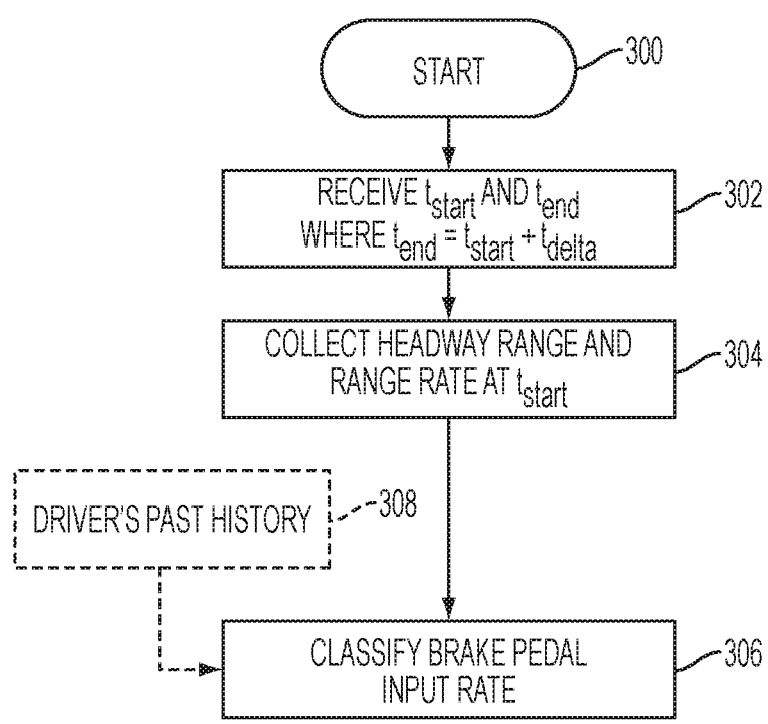
FIG. 3 is a flowchart illustrating a method for classifying a brake pedal input rate using headway range predictive information according to one or more embodiments of the present disclosure.

Now referring to FIG. 3, a flow diagram is shown having a start 300 for classifying a predicted brake pedal input rate based on vehicle headway range information. The headway range or distance to a preceding vehicle may be measured using electromagnetic waves and optics (e.g., LiDAR or RADAR). This calculation provides an indication of the need to brake due to proximity to other vehicles. A brake pedal input rate classification may be determined based on this headway range.

With continual reference to FIG. 3, the control algorithm may define a look ahead window or future time interval ($t_{start}$, $t_{end}$) over which a predicted brake pedal input rate is classified into an input level (e.g., High, Medium or Low), as shown at step 302. In particular, the controller may receive $t_{start}$ at step 302, which may be initiated by application of the brake pedal. The look ahead window or future time interval ($t_{start}$, $t_{end}$) may have a predefined length of time $t_{delta}$, resulting in $t_{end} = t_{start} + t_{delta}$. In step 304, the controller estimates the headway range and the rate of change of the headway range to make a prediction. The range rate may be predicted using a numerical method (e.g., moving average). The range rate may be calculated over a period beginning with depression of the brake pedal. At step 306, the controller may then classify the brake pedal input rate based on the headway range and predicted rate of change of the headway range over the look ahead window ($t_{start}$, $t_{end}$). For example, a vehicle having a small headway range and a large rate of change would require a generally stronger brake pedal input rate than a vehicle having a large headway range and small rate of change. In such a case, the vehicle having the small headway range and large rate of change may have a brake pedal input rate classification of High. Whereas, the vehicle having a large headway range and small rate of change may have a brake pedal input rate classification of Low.

Additionally, a controller may use a driver's past history, if available, to classify the predicted brake pedal input rate over the look ahead window or future time interval ($t_{start}$, $t_{end}$), as shown at step 308. Specifically, the controller may determine the predicted headway range and rate of change thereof and then refer to a lookup table to obtain a driver's past history of brake input for that headway range prediction. The controller can then use this information to classify the predicted brake pedal input rate into three or more input levels, such as High, Medium or Low, for example. One of ordinary skill in the art would understand that classification of the predicted brake pedal input rate is not limited to three input levels and other classification methods could be implemented.

Figure 4:
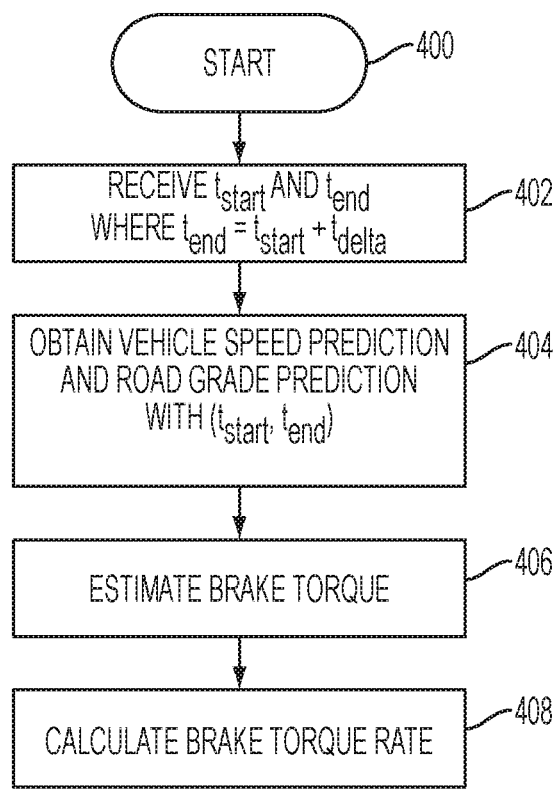
FIG. 4 is a flowchart illustrating a method for estimating brake torque rate using predictive information according to one or more embodiments of the present disclosure.

Now referring to FIG. 4, a flow diagram is shown having a start 400 for determining a predicted brake torque rate estimated from a vehicle speed prediction within a look ahead window or future time interval ($t_{start}$, $t_{end}$). In particular, the controller may receive $t_{start}$ at step 402, which may be initiated by application of the brake pedal. The look ahead window or future time interval ($t_{start}$, $t_{end}$) may have a predefined length of time $t_{delta}$, resulting in $t_{end} = t_{start} + t_{delta}$. In step 404, the controller obtains a vehicle speed prediction and road grade prediction within the look ahead window ($t_{start}$, $t_{end}$). As discussed above, road grade information can be obtained from geographical information systems (GIS) and global positioning systems (GPS) that can identify the location of a vehicle and the surrounding terrain. A vehicle speed prediction and braking torque prediction may be estimated using vehicle-to-vehicle (V2V) or vehicle to infrastructure (V2I) communications, generally referred to as V2X. The V2X prediction may include traffic flow monitoring systems. The V2X method may use vehicle speeds and road grade to estimate the braking torque. For example, a vehicle having a high rate of speed and a negative road grade may require a higher braking torque than a vehicle having a slow speed and a flat road grade.

The vehicle speed within ($t_{start}$, $t_{end}$) may be predicted using a linear representation. For example, if the vehicle speed must reach zero within the distance between $t_{start}$ and $t_{end}$, the controller will anticipate a linear slope to reach zero in the given distance. The vehicle speed may also be predicted with a more complex method, which may include other sources of information available to the vehicle controller, as described above. At step 406, the instantaneous brake torque may be estimated using known first principal equations when road grade, the coefficient of road friction, and the coefficient of drag are known. From this, the predicted brake torque rate can be determined at step 408.

Figure 5:
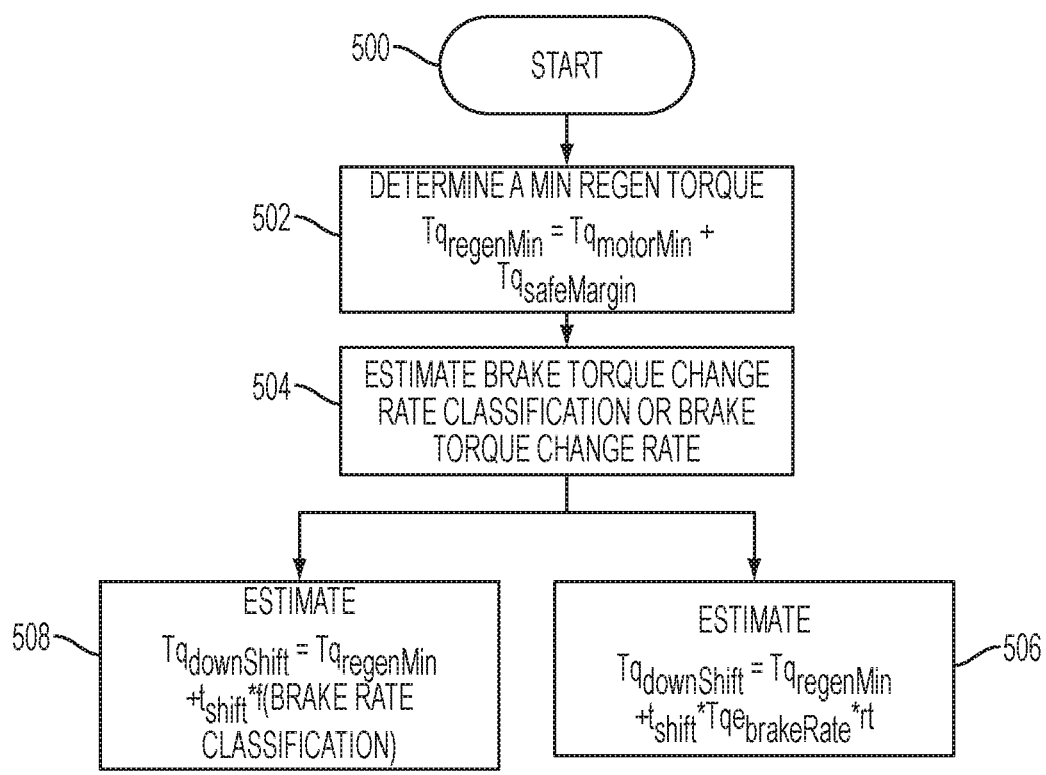
FIG. 5 is a flowchart illustrating a method for determining a regenerative braking downshift torque according to one or more embodiments of the present disclosure.

Now referring to FIG. 5, a flow diagram is shown having a start 500 for determining a regenerative braking downshift torque ($Tq_{downShift}$), which is the torque value at which regenerative braking downshift of the transmission is scheduled. At step 502, the controller determines a minimum regenerative torque ($Tq_{regenMin}$) based on the minimum motor torque ($Tq_{motorMin}$) plus a safe margin ($Tq_{safeMargin}$) associated with safe operation of the motor taking into consideration motor limits, resulting in $Tq_{regenMin} = Tq_{motorMin} + Tg_{safeMargin}$. At step 504, the controller then estimates the brake torque rate ($Tqe_{brakeRate}$) or the brake pedal input rate classification dependent on the vehicle information available. As shown at steps 506 and 508, the regenerative braking downshift torque ($Tq_{downShift}$) is estimated based on the minimum regenerative torque ($Tq_{regenMin}$) adjusted by a shift time ($t_{shift}$) and the brake torque rate ($Tqe_{brakeRate}$) or the brake pedal input rate classification (f(Brake Rate Classification)), dependent on available vehicle information. Here the shift time ($t_{shift}$) is the time between execution of the transmission gear downshift and a change in the torque ratio due to the shift.

If the brake torque rate ($Tqe_{brakeRate}$) is obtained as shown in step 506, the regenerative braking downshift torque ($Tq_{downShift}$) is calculated from the minimum regenerative torque ($Tq_{regenMin}$) plus the multiplication of the shift time ($t_{shift}$), the brake torque rate ($Tqe_{brakeRate}$), and a ratio (rt) that may be determined from the current motor speed and brake torque rate (and which can be obtained by a lookup table using such inputs). The resulting equation is then $Tq_{downShift} = Tq_{regenMin} + t_{shift} * Tqe_{brakeRate} * rt$. Alternatively, if the classification of the brake input rate is available as shown at step 508, the regenerative braking downshift torque ($Tq_{downShift}$) is calculated from the minimum regenerative torque ($Tq_{regenMin}$) plus the multiplication of the shift time ($t_{shift}$) and a function of the brake rate classification (f(Brake Rate Classification)). The resulting equation is then $Tq_{downShift} = Tq_{regenMin} + t_{shift} * f(Brake Rate Classification)$. In the equations described above, it is assumed that $Tq_{motorMin}$ is a negative number, $Tq_{safeMargin}$ is a positive number, and $Tqe_{brakeRate}$ is a positive number.

Figure 6:
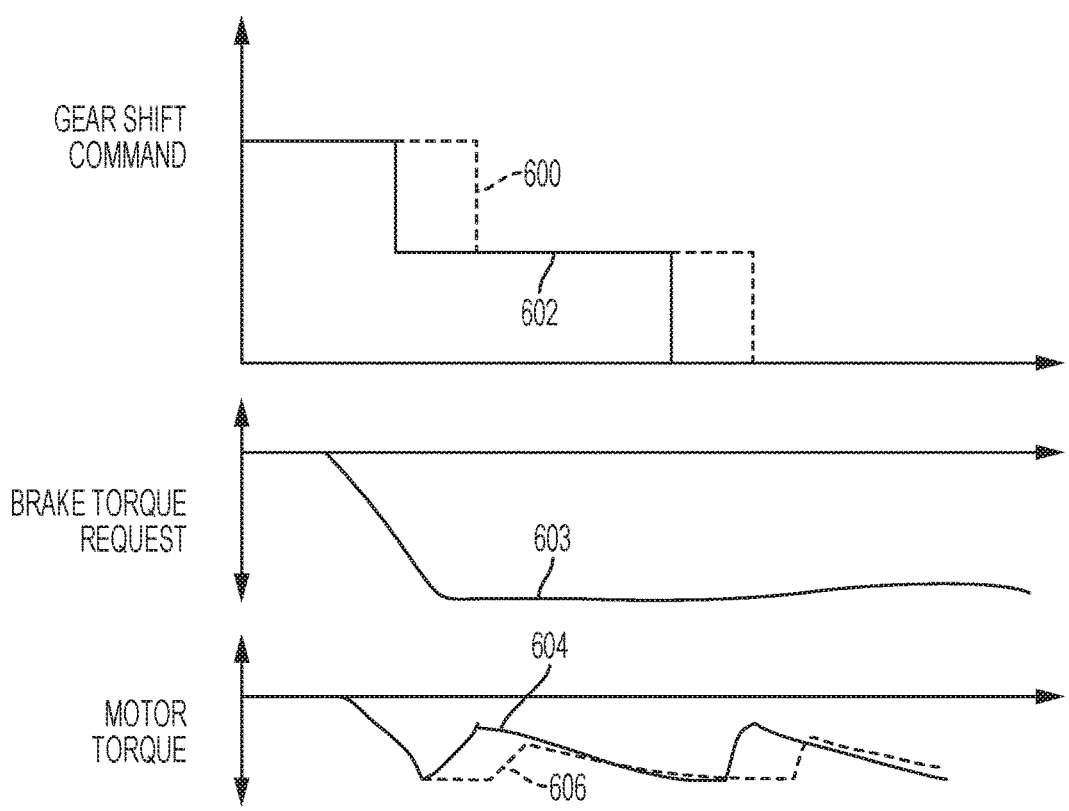
FIG. 6 is a graphical illustration of the effects of shift timing on motor torque according to one or more embodiments of the present disclosure.

Now referring to FIG. 6, a graphical illustration is provided for showing the effects of downshift timing on motor operation for a given brake torque request 603. In general, the electric motor operates at a constant torque region when the motor speed is below a base speed, and operates at a constant power region when the motor speed is above the base speed. As discussed above, the electric motor cannot deliver its maximum power when operating at this constant torque region. And upon actuation of the brake pedal, the electric motor speed is usually below this base speed and the brake torque increases from zero to a relatively constant level. It is therefore desired to raise the motor speed to have it operate at the constant power region to use the full potential of the electric motor to maximize regenerative braking efficiency.

With continual reference to FIG. 6, it is shown that a later gear downshift 600 leads to operation at this constant torque region 606 where the motor is constrained from delivering its maximum power, which results in less regenerative energy captured and therefore lower overall regenerative efficiency. In contrast, FIG. 6 illustrates that an earlier downshift 602 allows the motor to avoid operation at this constant torque region and instead operate at a constant power region as shown at 604, and therefore increases regenerative energy captured and overall regenerative efficiency.

As can be seen by the representative embodiments described herein, embodiments according to the present disclosure provide robust and efficient transmission downshift control strategies for improving regenerative braking efficiency and overall fuel economy.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A vehicle, comprising:
    an engine selectively coupled to a motor and a transmission; and
    a controller configured to, in response to actuation of a brake pedal, command the transmission to downshift during a regenerative braking event based on a regenerative braking downshift torque determined from a predicted brake pedal input rate, wherein the regenerative braking downshift torque is further determined from a transmission shift time that is based on an amount of time between execution of a transmission downshift and a change in a torque ratio resulting from downshifting the transmission during the regenerative braking event.

2. The vehicle of claim 1, wherein the predicted brake pedal input rate is based on an instantaneous road grade calculated upon actuation of the brake pedal and an average road grade estimated over a future time interval that begins with actuation of the brake pedal.

3. The vehicle of claim 2, wherein the instantaneous road grade is determined from at least one of geographical information systems and global positioning systems.

4. The vehicle of claim 1, wherein the predicted brake pedal input rate is based on a driver history.

5. The vehicle of claim 1, wherein the predicted brake pedal input rate is based on a headway range and a rate of change thereof.

6. The vehicle of claim 5, wherein the headway range is based on a distance to a preceding car measured using electromagnetic waves.

7. The vehicle of claim 1, wherein the predicted brake pedal input rate is classified as one of low, medium, and high.

8. A method comprising:
    in response to a brake pedal actuation, commanding a transmission of a vehicle to downshift during a regenerative braking event based on a regenerative braking downshift torque determined from one of a predicted brake pedal input rate and a predicted brake torque rate, wherein the regenerative braking downshift torque is further determined from a transmission shift time that is based on an amount of time between execution of a transmission downshift and a change in a torque ratio resulting from downshifting the transmission during the regenerative braking event.

9. The method of claim 8, wherein the predicted brake pedal input rate is based on a difference between an instantaneous road grade and an average road grade.

10. The method of claim 8, wherein the predicted brake pedal input rate is based on a driver history.

11. The method of claim 8, wherein the predicted brake pedal input rate is based on a headway range and a rate of change thereof.

12. The method of claim 8, wherein the predicted brake torque rate is based on a vehicle speed prediction and a road grade prediction within a future time interval that begins in response to the brake pedal actuation.

13. The method of claim 8, wherein the predicted brake torque rate is based on a predicted deceleration rate of the vehicle over a future time interval that begins in response to the brake pedal actuation.

* * * * *